United States Patent
Dakshinamoorthy et al.

(10) Patent No.: US 8,259,721 B2
(45) Date of Patent: Sep. 4, 2012

(54) TIME-BASED AUTHORIZATION OF INTERNET PROTOCOL (IP) MULTICAST SUBSCRIPTION SERVICES

(75) Inventors: Karthik Dakshinamoorthy, Karnataka (IN); Revati Mariappan, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 660 days.

(21) Appl. No.: 11/732,728

(22) Filed: Apr. 4, 2007

(65) Prior Publication Data

US 2008/0205396 A1   Aug. 28, 2008

(51) Int. Cl.
*H04L 12/56* (2006.01)
(52) U.S. Cl. ............... 370/392; 709/225; 725/29
(58) Field of Classification Search .............. 725/29
See application file for complete search history.

(56) References Cited

U.S. PATENT DOCUMENTS

| | | | |
|---|---|---|---|
| 6,285,748 B1 * | 9/2001 | Lewis | 379/112.01 |
| 6,532,233 B1 * | 3/2003 | Momona et al. | 370/390 |
| 7,739,372 B2 * | 6/2010 | Roese et al. | 709/223 |
| 2004/0264443 A1 | 12/2004 | Beck et al. | |
| 2005/0066353 A1 * | 3/2005 | Fransdonk | 725/29 |
| 2005/0129017 A1 * | 6/2005 | Guingo et al. | 370/390 |
| 2005/0281208 A1 * | 12/2005 | Dorenbosch et al. | 370/270 |
| 2007/0047545 A1 * | 3/2007 | Bou-Diab et al. | 370/390 |
| 2007/0064695 A1 * | 3/2007 | Song et al. | 370/390 |
| 2007/0280232 A1 * | 12/2007 | Dec et al. | 370/390 |
| 2007/0294735 A1 * | 12/2007 | Luo | 725/93 |

OTHER PUBLICATIONS

Finlayson, R, "An Abstract API for Multicast Address Allocation," Network Working Group, RFC 2771, Feb. 2000, The Internet Society.

* cited by examiner

*Primary Examiner* — Brian Roberts
(74) *Attorney, Agent, or Firm* — The Law Office of Kirk D. Williams

(57) ABSTRACT

A switching device (e.g., router, bridge) provides time-based authorization of multicast services. When a message is received to request the delivery of a multicast service or a first message is sent to a multicast group, a subscription policy for the IP multicast subscription service is retrieved. This subscription policy includes one or more limitations which allow the IP multicast subscription service during some predefined time of day/week or duration but prevent the IP multicast subscription service during some predefined time of day/week or duration. The switching device is configured to enforce these time-based authorization of multicast services policies.

18 Claims, 8 Drawing Sheets

DEFINITION OF
SUBSCRIPTION POLICIES
DEFINING TIME-BASED
RESTRICTIONS USING
TIME-BASED ELEMENTS
300

POLICY GOLD-VIEWERS  /301
PERMIT 228.1.1.1 ALL THE TIME
PERMIT 10.0.0.1 229.1.1.1 ONLY ON SUNDAY AFTERNOON
PERMIT 10.0.0.2 229.1.1.1 ONLY ON SUNDAY EVENING
PERMIT 10.0.0.3 229.1.1.1 ALL THE TIME
PERMIT 232.5.5.5 FOR 10 HOURS TOTALLY
<IMPLICIT DENY ALL>

POLICY SILVER-VIEWERS  /302
PERMIT 228.1.1.1 ON WED AND THU AFTER 11:00 PM TO 1:00 AM
PERMIT 10.0.0.3 229.1.1.1 ALL THE TIME
<IMPLICIT DENY ALL>

POLICY BRONZE-VIEWERS  /303
DENY 228.1.1.1 ALWAYS
PERMIT 10.0.0.3 229.1.1.1 ALL THE TIME
<IMPLICIT DENY ALL>
                                        /304
INTERFACE: ATTACH POLICY GOLD-VIEWERS
INTERFACE: ATTACH POLICY BRONZE-VIEWERS
INTERFACE: ATTACH POLICY GOLD-VIEWERS

FIGURE 3A

TIME-BASED AUTHORIZATION OF INTERNET PROTOCOL (IP) MULTICAST SUBSCRIPTION SERVICES

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

IP multicast networks are becoming more extensively used for applications such as video distribution and conference calling. IP multicasting is defined as the transmission of an IP datagram to a "host group", a set of zero or more hosts identified by a single IP destination address. A multicast datagram is delivered to all members of its destination host group with the same "best-efforts" reliability as regular unicast IP datagrams, i.e., the datagram is not guaranteed to arrive at all members of the destination group or in the same order relative to other datagrams. IP multicasting allows a host to create, join and leave host groups, as well as send IP datagrams to host groups using Internet Group Management Protocol (IGMP) and extension of the IP and local network service interfaces within the host. IGMP is used between IP hosts and their immediate neighbor multicast agents to support the creation of transient groups, the addition and deletion of members of a group, and the periodic confirmation of group membership.

Access control lists (ACLs) are implemented on packet switching devices to filter/allow traffic which corresponds to its rules and actions. An ACL may specify, inter alia, to apply its predefined rules to packets matching specified source and destination addresses, types of traffic, etc. Time-based ACLs are ACLs that can be enabled or disabled for a predetermined specified period of time (e.g., weekdays from 7:00-19:00). ACLs are typically implemented using associative memories which allow a fast lookup operation on a packet to identify whether a permit condition (allow the packet) or a deny condition (drop the packet) currently corresponds to the packet. As such, time-based ACLs are typically implemented by adding/modifying/removing entries from associative memories at appropriate time of days/days of weeks such that the associative memory reflects the current permit or deny policy for each packet.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 3A illustrates an example of a policy definition used in one embodiment;

DESCRIPTION OF EXAMPLE EMBODIMENTS

1. Overview

Figure 1:
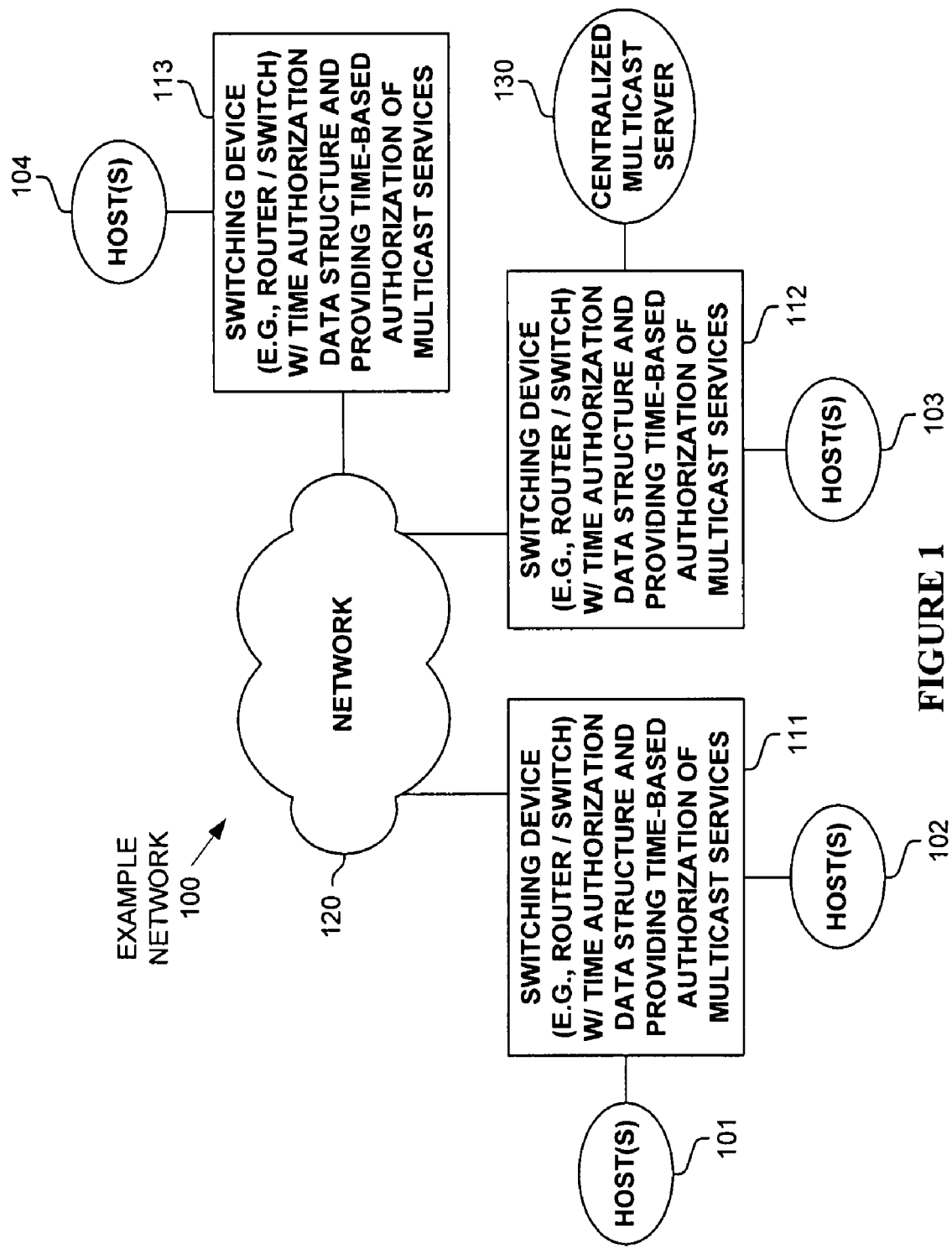
FIG. 1 illustrates an example network configuration useful for explaining the operation of one embodiment.

Disclosed are, inter alia, methods, apparatus, logic, computer-readable media, mechanisms, and means for providing time-based authorization of multicast services.

One embodiment is performed by a packet switching device which includes an interface. An Internet Protocol (IP) multicast group message is received on the interface, with the IP multicast group message specifying an IP multicast group address of an IP multicast subscription service. A subscription policy defining one or more time-based restrictions from a group of time based elements which allows participation in the multicast group for a limited portion of time greater than zero and less than all time is determined based on the specified IP multicast group address. In response to determining that the IP multicast subscription service currently conforms to said determined subscription policy, packets identified with the IP multicast subscription service are forwarded out of the packet switching device via the interface, or in response to determining that the IP multicast subscription service does not currently conform to said determined subscription policy, packets belonging to the IP multicast subscription service are not forwarded out of the packet switching device via the interface.

2. Description

Disclosed are, inter alia, methods, apparatus, logic, computer-readable media, mechanisms, and means for providing time-based authorization of multicast services.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "port" or "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, logic, computer-readable media, mechanisms, and means for providing time-based authorization of multicast services.

One embodiment is performed by a packet switching device which includes an interface. An Internet Protocol (IP) multicast group message is received on the interface, with the IP multicast group message specifying an IP multicast group address of an IP multicast subscription service. A subscription policy defining one or more time-based restrictions from a group of time based elements which allows participation in the multicast group for a limited portion of time greater than zero and less than all time is determined based on the specified IP multicast group address. In response to determining that the IP multicast subscription service currently conforms to said determined subscription policy, packets identified with the IP multicast subscription service are forwarded out of the packet switching device via the interface, or in response to determining that the IP multicast subscription service does not currently conform to said determined subscription policy, packets belonging to the IP multicast subscription service are not forwarded out of the packet switching device via the interface.

In one embodiment, the operation of determining the subscription policy includes performing a lookup operation based on said specified IP multicast group address in a time authorization data structure tangibly stored in the packet switching device. In one embodiment, the subscription policy defines a duration of time authorized for the IP multicast subscription service; and wherein in response to the operation of determining that the IP multicast subscription service currently conforms to the subscription policy, a scheduling operation is performed to cause the termination of the forwarding of packets belonging to the IP multicast subscription service from the interface in response to the expiration of the time duration. In one embodiment, the scheduling operation includes setting a timer to indicate end of the time duration. In one embodiment, the operation of determining the subscription policy includes performing a lookup operation based on said specified IP multicast group address in a time authorization data structure tangibly stored in the packet switching device; and wherein in response to the expiration of the time duration, updating the time authorization data structure to reflect the expiration of the duration of time authorized for the IP multicast subscription service for the interface. In one embodiment, the operation of determining the subscription policy includes performing a lookup operation based on said specified IP multicast group address in a time authorization data structure tangibly stored in the packet switching device; and wherein in response to the interface disconnecting with the IP multicast subscription service, the time authorization data structure is updated to reflect the time used by the interface for the IP multicast subscription service.

In one embodiment, the operation of determining the subscription policy includes communicating with a subscription server external to the packet switching device to receive a description of the subscription policy. In one embodiment, the packet switching device is a router. In one embodiment, the packet switching device is a bridge. In one embodiment, the IP multicast group message is an Internet Group Management Protocol (IGMP) message. In one embodiment, the IGMP message is an IGMP response message. In one embodiment, the IP multicast group message is a message from a multicast source for the IP multicast subscription service. In one embodiment, the subscription policy specifies a particular time-based restriction of said time-based restrictions for when a particular source can send packets to the IP multicast subscription service. In one embodiment, the IP multicast subscription service is a bi-directional service such that a host connected to the interface can also be a multicast source of the IP multicast subscription service, and wherein the subscription policy defines a finite time period during which the host is authorized to be a multicast source of the IP multicast subscription service. In one embodiment, the IP multicast subscription service includes participation in a conference call. In one embodiment, at least one of said time-based restrictions specifies a time of day. In one embodiment, at least one of said time-based restrictions specifies a day of the week. In one embodiment, at least one of said time-based restrictions specifies a time allocation.

One embodiment includes logic encoded in one or more tangible media for execution and when executed operable to perform operations comprising: determining for a received IP multicast group message specifying an IP multicast group address of an IP multicast subscription service a subscription policy, the subscription policy defining one or more time-based restrictions from a group of time based elements which allows participation in the multicast group for a limited portion of time greater than zero and less than all time; and in response to determining that the IP multicast subscription service currently conforms to the subscription policy identified by said determining operation, forwarding packets identified with the IP multicast subscription service, or in response to determining that the IP multicast subscription service does not currently conform to the subscription policy, not forwarding packets belonging to the IP multicast subscription service. In one embodiment, the operation of determining the subscription policy includes performing a lookup operation based on said specified IP multicast group address in a tangibly stored time authorization data structure.

One embodiment includes a plurality of interfaces configured to send and receive packets; means for determining for a received IP multicast group message specifying an IP multicast group address of an IP multicast subscription service a subscription policy, the subscription policy defining one or more time-based restrictions from a group of time based elements which allows participation in the multicast group for a limited portion of time greater than zero and less than all time; and means for causing packets to be forwarded or not to be forwarded in response to determining whether or not the IP multicast subscription service currently conforms to the subscription policy.

In one embodiment, the subscription policy defines a duration of time authorized for the IP multicast subscription service; and wherein the apparatus includes means for causing the termination of the forwarding of packets belonging to the IP multicast subscription service from the interface in response to the expiration of the time duration. In one embodiment, said means for determining the subscription policy includes means for performing a lookup operation on a time authorization data structure tangibly stored in the apparatus to retrieve a definition of the subscription policy from the time authorization data structure; and wherein the apparatus includes means for updating the time authorization data structure to reflect the time used for the IP multicast subscription service in response to a disconnection with the IP multicast subscription service.

Turning expressly to the figures, FIG. 1 illustrates an example network 100, which includes multiple hosts 101-104, centralized multicast server 130, switching devices 111-113, and a network 120 connecting items as illustrated. As illustrated, each of switching devices 111-113 include a time authorization data structure tangibly stored therein and provide time-based authorization of multicasts services (e.g., IP or other multicast services such as video and audio distribution, bi-directional conferencing, etc.). Of course, some switching devices in a network may not support time-based authorization of multicast services as disclosed herein.

Figure 2:
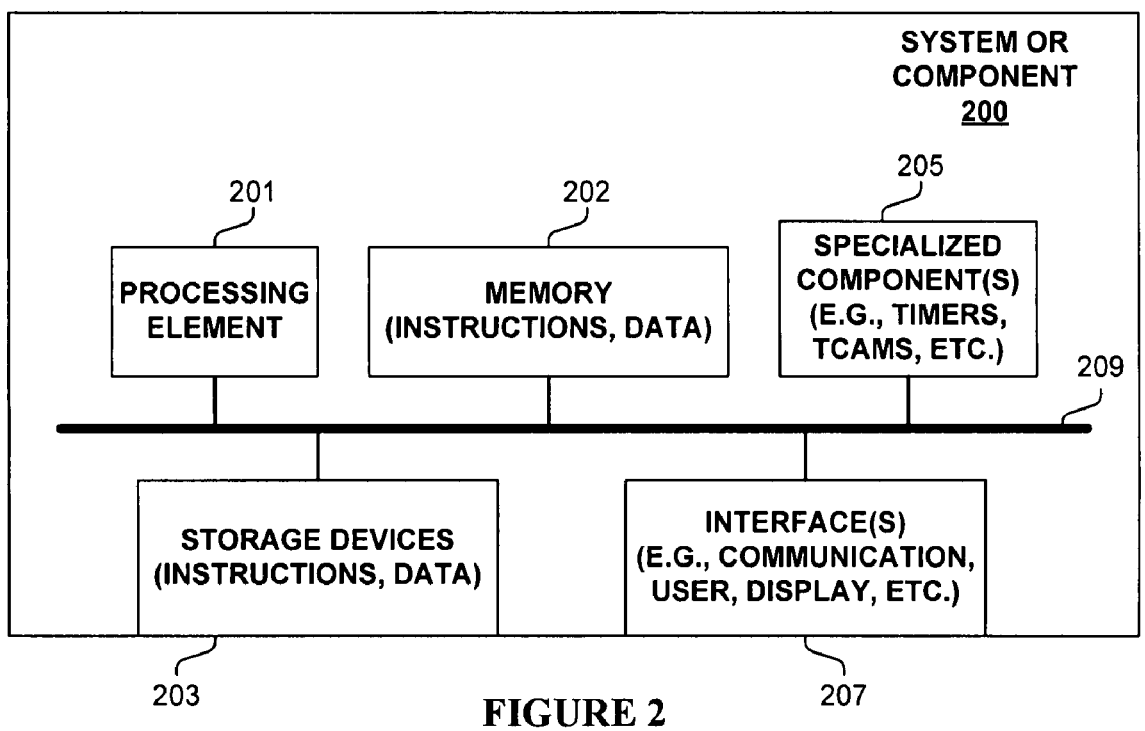
FIG. 2 illustrates an example system or component used in one embodiment.

FIG. 2 is block diagram of a system or component 200 used in one embodiment that provides time-based authorization of multicast services. In one embodiment, system or component 200 performs one or more processes corresponding to one of the flow diagrams illustrated or otherwise described herein.

In one embodiment, system or component 200 includes a processing element 201, memory 202, storage devices 203, specialized components 205 (e.g. optimized hardware such as for performing classification operations, providing timing notifications, etc.), and interfaces 207 for communicating information (e.g., sending and receiving packets, user-interfaces, displaying information, etc.), which are typically communicatively coupled via one or more communications mechanisms 209, with the communications paths typically tailored to meet the needs of the application.

Various embodiments of component 200 may include more or less elements. The operation of component 200 is typically controlled by processing element 201 using memory 202 and storage devices 203 to perform one or more tasks or processes. Memory 202 is one type of computer-readable medium, and typically comprises random access memory (RAM), read only memory (ROM), flash memory, integrated circuits, and/or other memory components for tangibly storing information (natively or in data structures). Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

FIG. 3A illustrates a definition of subscription policies 300, that, for example, could be entered via a command line interface (CLI) or in a configuration file. As shown, subscription policies 300 define time-based restrictions (e.g., when or for how long a multicast service is authorized or not authorized) using time-based elements (e.g., days, times, durations, etc.).

One embodiment defines time-based authorization services according to multiple service level agreements. Shown in FIG. 3A are three such service levels: gold-viewer policy 301, silver-viewer policy 302 and bronze-viewer policy 303, which can be attached to interfaces (including ports) as illustrated by specification 304. For example, gold-viewer policy 301 allows IP multicast subscription service 228.1.1.1 [(i.e., IP multicast channel (*,228.1.1.1)] all the time, allows IP multicast service/channel (10.0.0.1, 229.1.1.1) only on Sunday afternoon, and so on. Note, as used herein, the terms "duration" or "time duration" are used to define an amount of time (e.g., ten hours, etc.) that a multicast service can be used during a subscription period, with the use of these terms in contrast to a specific time period (e.g., Wednesday, 2:00-3:00 PM).

Figure 3B:
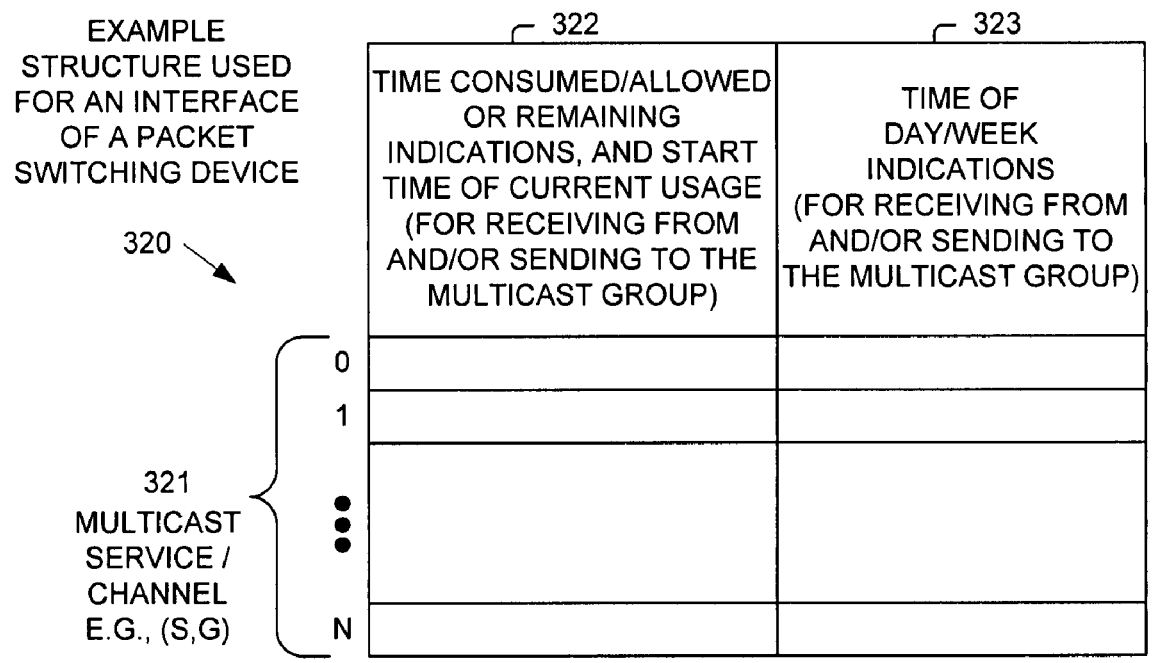
FIG. 3B illustrates an example of a data structure used in one embodiment.

FIG. 3B illustrates an example data structure 320 used by an embodiment for tracking usage and determining whether or not a particular multicast service/channel 321 is authorized for a time of day/week or time duration. Basically, if a time duration (e.g., ten hours) is specified for a multicast service or channel 321, field 322 is used to track the amount of time available or used, and possibly is used as a scratchpad to store the start time of a current usage so a used time duration can be identified upon disconnection from an active multicast service and possibly to store a maximum amount of time duration allowed for a current subscription period. Field 323 is used to store time of day/week indications specified for a multicast service or channel 321. Therefore, for a packet received on a particular interface, it can readily be determined based on data structure 320 for the particular interface and for the particular multicast service or channel 321 whether or not the service/channel is authorized based on fields 322 and 323. One embodiment allows time-based authorization to be differentiated for being a sender and a receiver, in which case, these different values are reflected in data structure 320.

Figure 4:
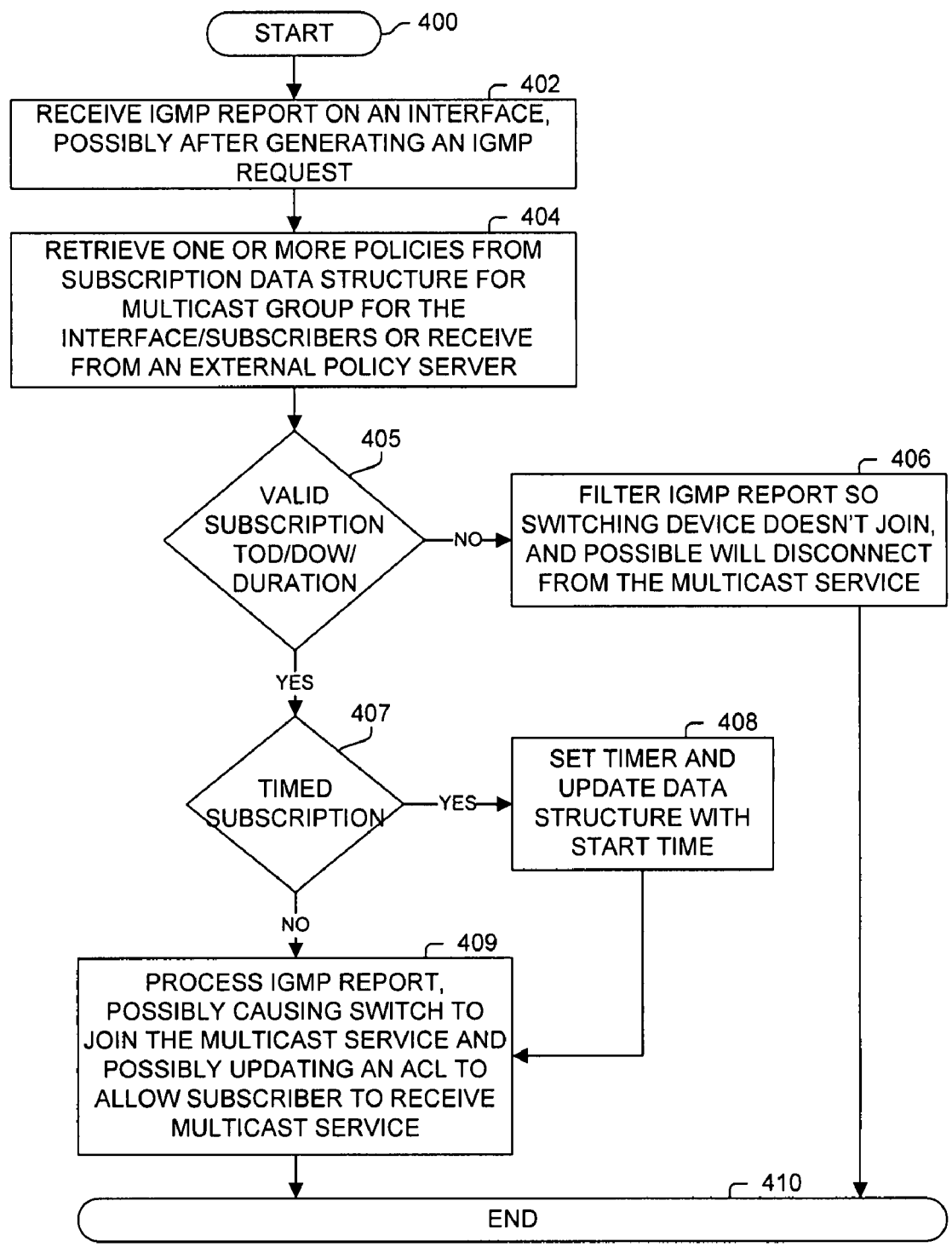
FIG. 4 illustrates a process used in one embodiment performing time-based authorization of multicast services.

FIG. 4 illustrates a process used in one embodiment providing time-based authorization of multicast services, such as to a desired receiver of a multicast service. Processing begins with process block 400, and proceeds to process block 402, wherein received is a message identifying a multicast service. For example, the message could be, but is not limited to, an Internet Group Management Protocol (IGMP) message, possibly in response to an IGMP request. In process block 404, one or more subscription policies (e.g., time of day/week, time duration) for the interface/multicast group are retrieved from a subscription data structure or received from an external policy server. As determined in process block 405, if the subscription is not valid for the current time of day/day of week (if specified) and/or its authorized time duration (if specified) for the subscription period has been exhausted, then in process block 406, the message (e.g., IGMP report) is filtered/dropped in one embodiment so that the switching device does not join the multicast group if it is not already receiving the multicast service and possibly will time-out and disconnect from the multicast service. In one embodiment, the switching device will disconnect from the multicast service if no other interface currently subscribes to the specified multicast service.

Otherwise, the multicast service was determined to be authorized according to the defined time-based authorization for the multicast service (or none was specified with the default being allowed to receive the multicast service). As determined in process block 407, if a time duration is specified for the service, then in process block 408 a timer is set to expire when the authorization time duration is expired, and a data structure is updated with the start time of the service (so a time duration of use can subsequently be determined upon disconnection from the service). In process block 409, the received IP message is processed, possibly causing the switching device to join the multicast service and/or possibly updating an access control list (ACL) to allow subscriber to receive the desired multicast service (e.g., multicast service/channel). Processing of the flow diagram illustrated in FIG. 4 is complete as indicated by process block 410.

Figure 5:
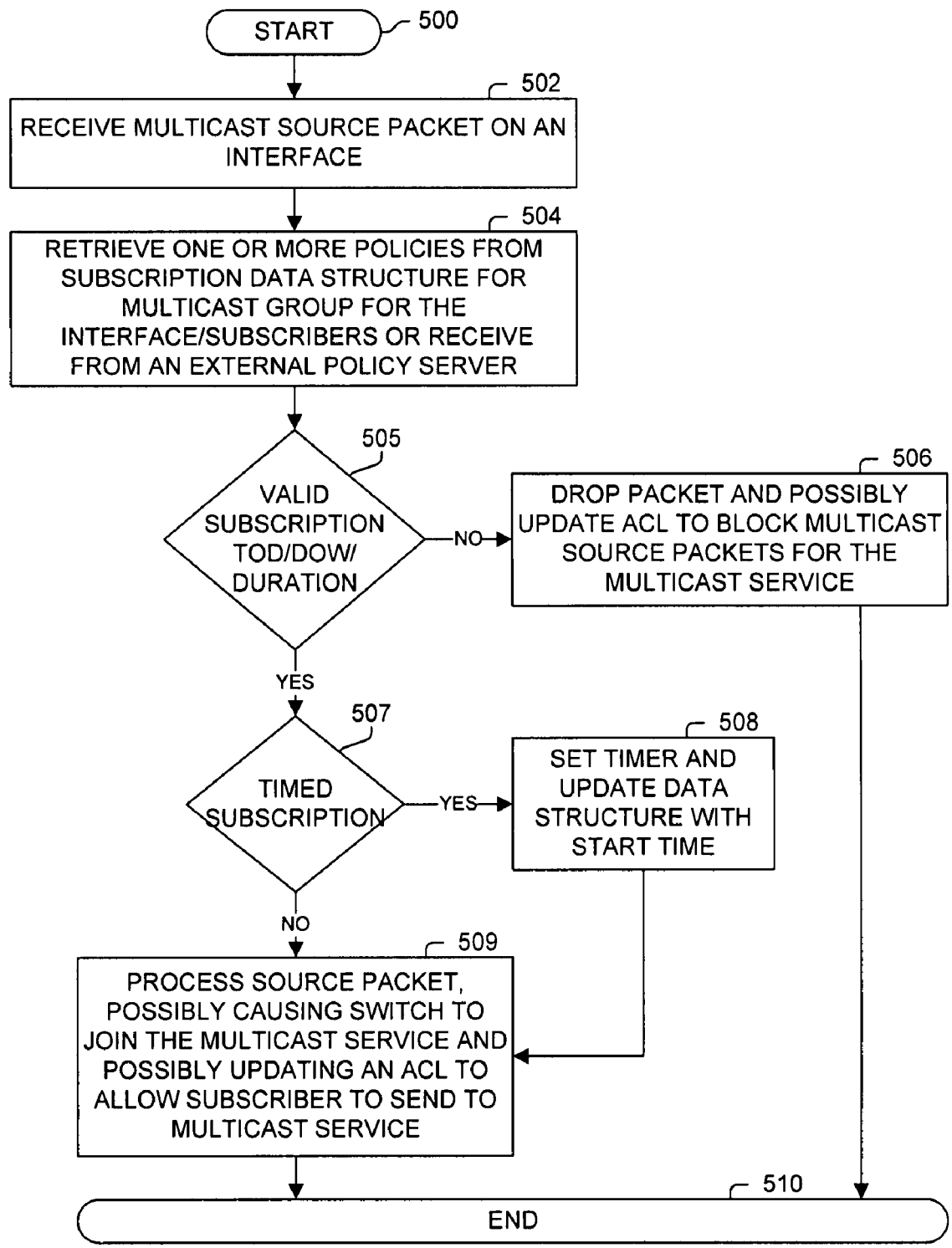
FIG. 5 illustrates a process used in one embodiment performing time-based authorization of multicast services.

FIG. 5 illustrates a process used in one embodiment providing time-based authorization of multicast services, such as to a desired sender in a multicast service already being received, such as, but not limited to, according a process similar to that illustrated in FIG. 4;

Processing of the flow diagram illustrated in FIG. 5 begins with process block 500, and proceeds to process block 502, wherein a multicast source message identifying a multicast service is received. For example, the message could be, but is not limited to, a member of a multicast group authorized to be received, with the host trying to send information to the multicast group (e.g., trying to speak during a conference call, providing voice, data or video to the multicast group, etc.). In process block 504, one or more subscription policies (e.g., time of day/week, time duration) for the interface/multicast group are retrieved from a subscription data structure or received from an external policy server. As determined in process block 505, if the subscription is not valid for the current time of day/day of week (if specified) and/or its authorized time duration (if specified) for the subscription period has been exhausted, then in process block 506, the message is filtered/dropped. In one embodiment, an ACL is updated to block the host from sending packets to the multicast group.

Otherwise, the host was determined to be authorized to send to the multicast group according to the defined time-based authorization for the multicast service (or none was specified with the default allowing such sending). As determined in process block 507, if a time duration is specified for sending to the service, then in process block 508 a timer is set to expire when the authorization time duration is expired, and a data structure is updated with the start time of the service (so a time duration of use can subsequently be determined upon disconnection from the service). In process block 509, the received source packet is processed, typically including being forwarded to the multicast group, which possibly causes the switching device to join the multicast service and/or possibly updating an ACL to allow subscriber to send to the desired multicast service (e.g., multicast service/channel). Processing of the flow diagram illustrated in FIG. 5 is complete as indicated by process block 510.

Figure 6:
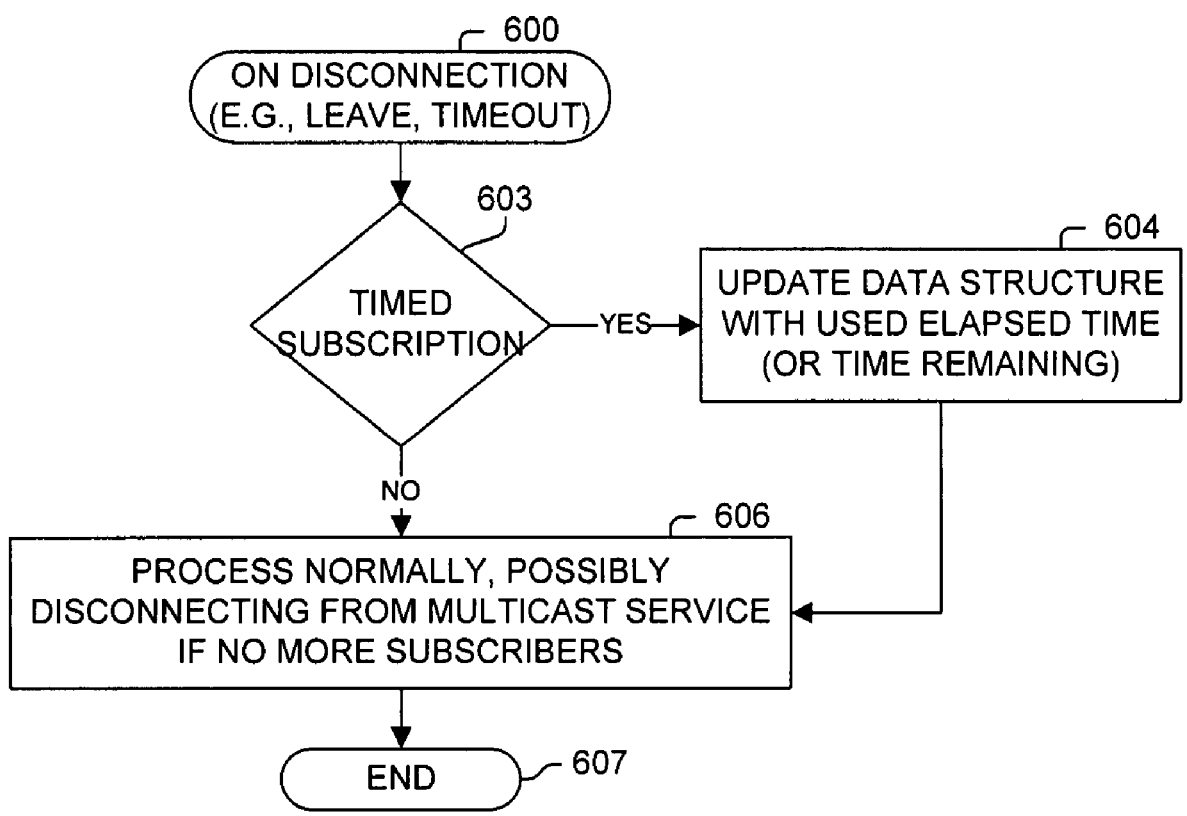
FIG. 6 illustrates a process used in one embodiment performing time-based authorization of multicast services.

FIG. 6 illustrates a process for updating a tracked time duration upon disconnecting from a multicast service used in one embodiment. Processing begins with process block 600, which is triggered by a disconnection from a multicast service, either from receiving and/or sending. As determined in process block 603, if a time duration is being tracked, then in process block 604, a data structure is updated to reflect the additional usage for sending and/or receiving the multicast service. In process block 606, the disconnection is processed normally, possibly causing the switching device to disconnect from the multicast service if there are no more subscribers receiving the multicast service from the switching device. Processing of the flow diagram illustrated in FIG. 6 is complete, as indicated by process block 607.

Figure 7:
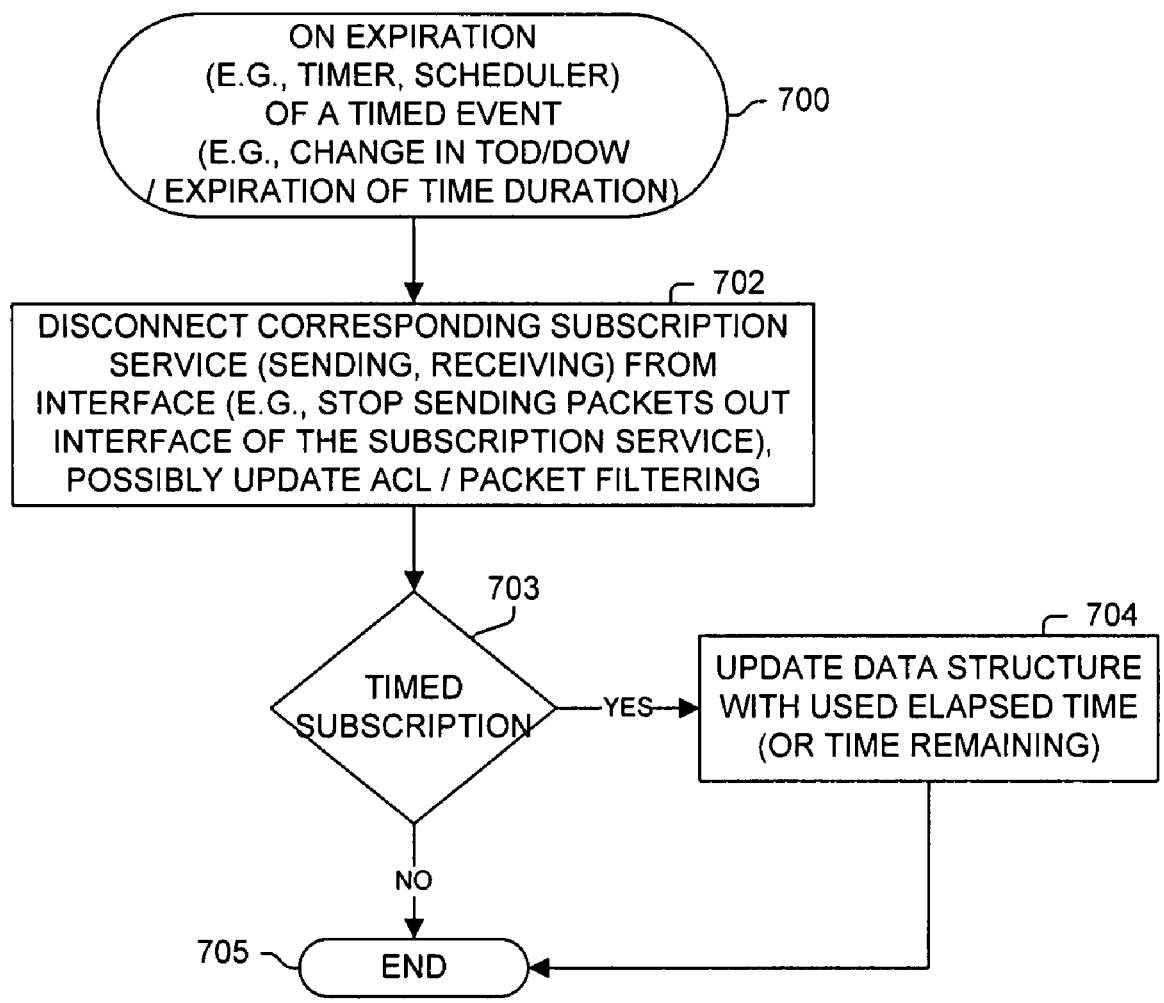
FIG. 7 illustrates a process used in one embodiment performing time-based authorization of multicast services.

FIG. 7 illustrates a process used in one embodiment. Upon the expiration of a timed event (as determined, for example, by a scheduler or by the expiration of a timer) of a timed event (e.g., the authorized time of day (TOD)/day of week (DOW), or the authorized time duration exhausted) as indicated by process block 700, processing proceeds to process block 702. As indicated by process block 702, the interface is disconnected from the multicast service (e.g., receiving and/or sending to). In one embodiment, an ACL is updated to prevent further sending or receiving according to the time-based subscription service according to its specified time-based subscription policy. As determined in process block 703, if the service policy specifies a time duration, then in process block 704, a data structure is updated to reflect the additional usage. Processing of the flow diagram illustrated in FIG. 7 is complete, as indicated by process block 707.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by a packet switching device, the packet switching device including an interface, the method comprising:
   receiving an Internet Protocol (IP) multicast group message on the interface of the packet switching device, the IP multicast group message specifying an IP multicast group address of an IP multicast subscription service;
   determining, by the packet switching device, based on said specified IP multicast group address a subscription policy, the subscription policy defining one or more time-based restrictions from a group of time-based elements which allows participation in the multicast group for a limited portion of time greater than zero and less than all time; wherein the subscription policy defines a duration of time authorized for the IP multicast subscription service; and
   in response to determining that the IP multicast subscription service currently conforms to said determined subscription policy, the packet switching device: forwarding packets identified with the IP multicast subscription service out of the packet switching device via the interface, and performing a scheduling operation to cause the termination of the forwarding of packets belonging to the IP multicast subscription service from the interface in response to the expiration of the duration of time;
   wherein the duration of time is an amount of time, not a specified time period.

2. The method of claim 1, wherein said determining the subscription policy includes performing a lookup operation based on said specified IP multicast group address in a time authorization data structure tangibly stored in the packet switching device.

3. The method of claim 1, wherein said scheduling operation includes setting a timer to indicate end of the duration of time.

4. The method of claim 1, wherein said determining the subscription policy includes performing a lookup operation based on said specified IP multicast group address in a time authorization data structure tangibly stored in the packet switching device; and wherein in response to the expiration of the duration of time, updating the time authorization data structure to reflect the expiration of the duration of time authorized for the IP multicast subscription service for the interface.

5. The method of claim 1, wherein said determining the subscription policy includes performing a lookup operation based on said specified IP multicast group address in a time authorization data structure tangibly stored in the packet switching device; and wherein in response to the interface disconnecting with the IP multicast subscription service, updating the time authorization data structure to reflect the time used by the interface for the IP multicast subscription service.

6. The method of claim 1, wherein said operation of determining the subscription policy includes communicating with a subscription server external to the packet switching device to receive a description of the subscription policy.

7. The method of claim 1, wherein the packet switching device is a router.

8. The method of claim 1, wherein the packet switching device is a bridge.

9. The method of claim 1, wherein the IP multicast group message is an Internet Group Management Protocol (IGMP) message.

10. The method of claim 9, wherein the IGMP message is an IGMP response message.

11. The method of claim 1, wherein the IP multicast group message is a message from a multicast source for the IP multicast subscription service.

12. The method of claim 1, wherein the subscription policy specifies a particular time-based restriction of said time-based restrictions for when a particular source can send packets to the IP multicast subscription service.

13. The method of claim 1, wherein at least one of said time-based restrictions specifies a time of day.

14. The method of claim 1, wherein at least one of said time-based restrictions specifies a day of the week.

15. The method of claim 1, wherein at least one of said time-based restrictions specifies a time allocation.

16. A method performed by a packet switching device, the packet switching device including a plurality of interfaces, the method comprising:
   (a) authorizing, by the packet switching device, the receiving of an Internet Protocol (IP) multicast service by a host, including: receiving an IP multicast group message on a particular interface of the plurality of interfaces, the IP multicast group message specifying an IP multicast group address of an IP multicast subscription service; determining based on said specified IP multicast group address a subscription policy, the subscription policy defining one or more time-based restrictions from a group of time-based elements which allows receiving the multicast group for a limited portion of time greater than zero and less than all time; and in response to determining that the IP multicast subscription service currently conforms to said determined subscription policy, forwarding packets identified with the IP multicast subscription service out of the packet switching device via the particular interface until unauthorized for said receiving the multicast group based on the expiration of the limited portion of time; wherein the IP multicast subscription service is a bi-directional service such that the host can also be a multicast source of the IP multicast subscription service, and wherein the subscription policy defines a finite time period or duration, less than the limited portion of time the host is authorized to receive the IP multicast group, during which the host is also authorized to be a multicast source of the IP multicast subscription service; and
   (b) authorizing, by the packet switching device subsequent to said authorizing the receiving of the IP multicast service by the host and while the host is authorized to receive the IP multicast group, the sending to the IP multicast group by the host, including: forwarding, from the packet switching device, multicast source packets received from the host during the finite time period or duration until unauthorized for said sending by the expiration of the finite time period or duration.

17. The method of claim 16, wherein the IP multicast subscription service includes participation in a conference call.

18. The method of claim 16, wherein the subscription policy defines both the limited portion of time and the finite time period in terms of durations of time; wherein the term "duration of time" defines a subscribed quantity of time, not a time period with particular starting or ending times.

* * * * *

UNITED STATES PATENT AND TRADEMARK OFFICE
CERTIFICATE OF CORRECTION

PATENT NO. : 8,259,721 B2  
APPLICATION NO. : 11/732728  
DATED : September 4, 2012  
INVENTOR(S) : Dakshinamoorthy et al.

Page 1 of 1

It is certified that error appears in the above-identified patent and that said Letters Patent is hereby corrected as shown below:

Face of the Patent, insert Item (30)

-- (30)    Foreign Application Priority Data,  
February 22, 2007 (IN) ................373/DEL/2007 --

Signed and Sealed this  
Fifth Day of February, 2013

Teresa Stanek Rea  
*Acting Director of the United States Patent and Trademark Office*